C. J. DORRANCE.
TROLLEY HARP.
APPLICATION FILED DEC. 20, 1920.
1,424,716.
Patented Aug. 1, 1922.
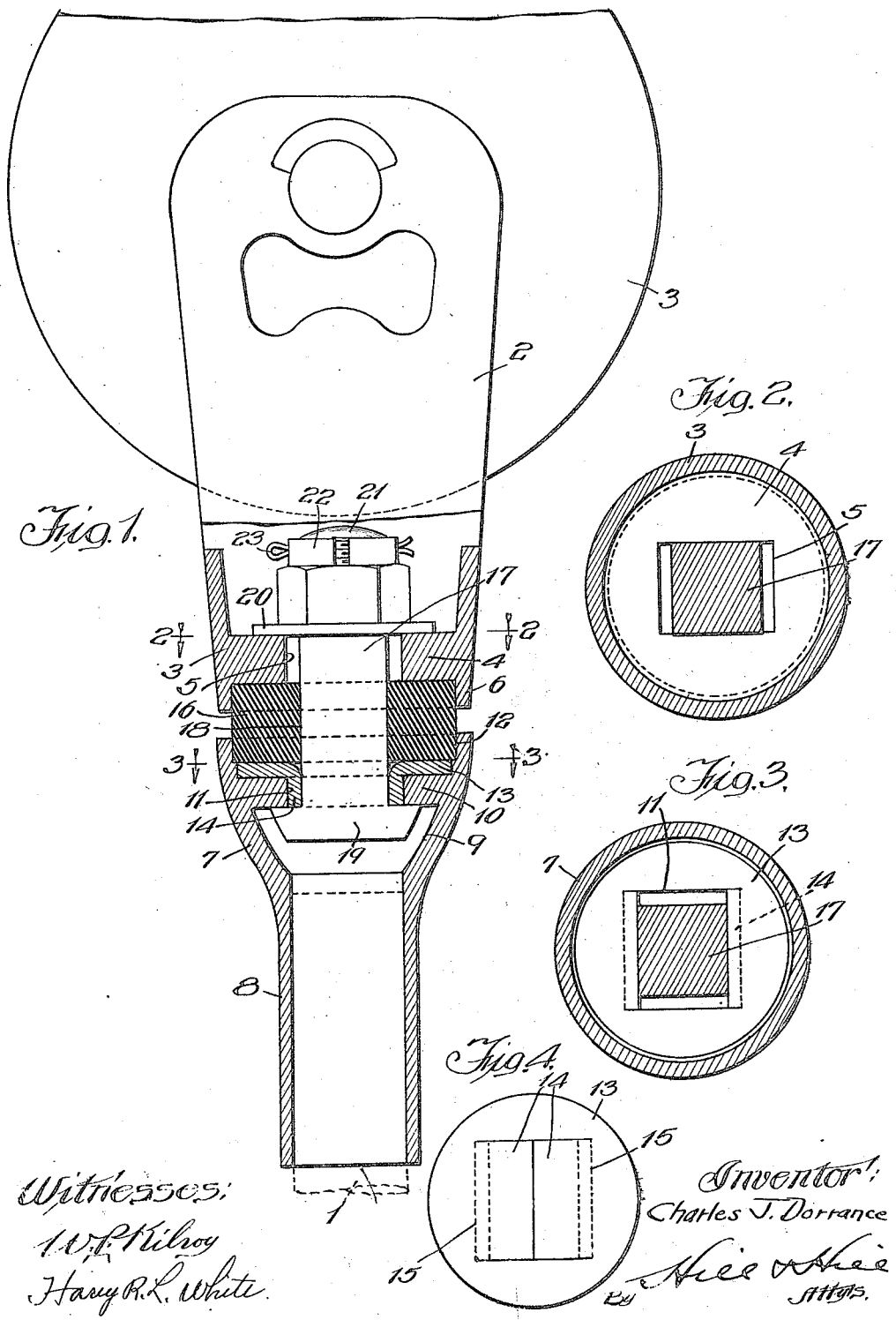
Witnesses:
W. F. Kilroy
Harry R. L. White
Inventor:
Charles J. Dorrance

UNITED STATES PATENT OFFICE.

CHARLES J. DORRANCE, OF CHICAGO, ILLINOIS.

TROLLEY HARP.

1,424,716. Specification of Letters Patent. Patented Aug. 1, 1922.

Application filed December 20, 1920. Serial No. 431,936.

*To all whom it may concern:*

Be it known that I, CHARLES J. DORRANCE, a citizen of the United States, residing at Chicago, in the county of Cook and State of Illinois, have invented certain new and useful Improvements in a Trolley Harp, of which the following is a description.

This invention is similar to that disclosed in my co-pending application, Serial No. 375,541, filed April 21, 1920, now Patent No. 1,394,507, dated Oct. 18, 1921, and belongs to that general class of devices known as trolley poles, and relates particularly to a shock absorbing device applicable for use on the pole for carrying the trolley wheel or other trolley contact device or the equivalent of the harp and wheel. The invention has among its objects the production of a device of the kind described that is simple, convenient, durable, reliable, compact, efficient and satisfactory. It has particularly as an object the production of a device for holding the trolley wheel on the wire at all times, preventing the wheel or contact device from jumping from the trolley wire. The invention has particularly among its objects the production of a trolley pole device of the kind described that will prove economical and desirable for the user by reducing (1) the ordinary repairs heretofore constantly necessary on the overhead wires and supports therefor; (2) arcing on the wheel and wire; (3) noise; (4) wear on the wheel and overhead conductor or trolley wire; (5) damage by dewirement; (6) liability for injury caused by damaged equipment; (7) loss of power; (8) crystallization; and (9) renewal of the incandescent lamps for lighting purposes. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a view in elevation and partly in section of a portion of a trolley pole and harp with my device applied thereto;

Fig. 2 is a sectional view taken substantially on line 2—2 of Fig. 1;

Fig. 3 is a sectional view taken substantially on line 3—3 of Fig. 1; and

Fig. 4 is a plan view of the slot washer blank.

Referring to the drawings, it may be mentioned that my device is intended to be ordinarily located at the upper or free end of the trolley pole for carrying the trolley wheel, or such other trolley wire contact device as may be desired, the same being substantially a real universal joint as well as a substantially perfect shock absorber. In Fig. 1, I have shown the upper end of the trolley pole 1, in dotted lines, the harp 2 as it is commonly known, and trolley wheel or contact device 3, my invention consisting of suitable means or mechanism for securing the trolley harp and wheel at the end of the pole and carrying the same thereat.

In my improved construction the trolley harp 2 has a base 3, preferably circular, and has a web 4 extending transversely across its lower end, said web being provided with an elongated slot 5 through the same, said slot being preferably rectangular, as most clearly shown in Fig. 2. A flange 6 projects beyond the web, as shown, and provides a recess in the bottom face of the harp.

I also provide a suitable part 7 formed with a socket 8 arranged to receive the end of the trolley pole, which may be secured thereto in any suitable manner. The member 7 is preferably formed with a recess 9, and is provided with a web 10 extending across its upper end similarly to the web 4 in the member 3, the web 10 being preferably provided with the slot 11 through the same, said slot being preferably square as shown in Fig. 3. Part 7 is also provided with a flange 12 projecting beyond the web, similar to the flange 6 of part 3. Arranged within the slot 11 concentrically with the axis of part 7 is a slot washer 13, said washer having a main body portion lying within the confines of the flange 12 and supported by the web 10, and having a pair of downturned ears or lugs 14, said lugs 14 fitting snugly within the slot 11, as most clearly shown in Fig. 3, whereby there is formed a rectangular, elongated slot in the member 7 and extending transversely to the slot 5. This washer is preferably formed by slitting the washer blank as shown in Fig. 4, and then bending the ears or lugs along the parallel lines of the fold 15. The forming of the washer may be accomplished in any other desired manner, as by drop forging, casting or the like.

Arranged between the parts 3 and 7 is a resilient or elastic cushion part 16, preferably of rubber or other yieldable or elastic material, or of spring metal, the same being of a size and shape to tightly fit within the flanges 6 and 12 of the parts 3 and 7, and separating them substantially as shown in Fig. 1. The parts are secured together by a bolt 17 whose shank part extends through an opening 18 in the resilient member 16 and through the slots 5 and 11. The head 19 of bolt 3 is preferably flattened on opposite sides so as to form an elongated head having one pair of sides longer than the other pair of sides, the narrower dimension of the head being equal to or less than the length of the slot 11, while the longer dimension of the head may be greater than the length of the slot opening 11, as shown in Fig. 1. Thus it is possible to first insert the bolt head through the slot 11 so that it abuts against the inner surface of the web 10. The washer 13 is then arranged in place over the bolt 17 so that the bolt shank has a snug fit in one direction, but is free to slide or move in the other direction at right angles to the first direction.

There is preferably provided a washer or the equivalent 20 on the bolt member 17, said washer being adapted to bear against the face of the web 4. The member 17, which is preferably rectangular in shape at the shank or center, as most clearly shown in Figs. 2 and 3, is preferably formed with a threaded end 21 adapted to receive a castellated nut 22, said nut being locked in place by a cotter pin 23 or the equivalent, in the well known manner. The desired tension may be put on the parts by screwing up the nut, thereby slightly compressing the resilient or elastic part 16, or its equivalent, which, as before mentioned, may be of rubber, spring metal or the like.

It may be mentioned that the slots or openings are preferably made of a size to substantially fit the shank portion of the bolt 17, and that the members 3 and 7 are relatively arranged so that the elongated openings extend transversely with one another. When so constructed, the parts may be flexed in any direction, one or both parts 3 and 7 cooperating with the shank 17, permitting the flexing. When the parts are flexed, however, the resilient or elastic body 16 is compressed, the same tending to bring the parts back to normal position as soon as the cause of the flexing is removed. With this construction, the device provides efficient electrical contacts, as the current flowing down from the wheel and harp passes into part 4; thence through the washer 20 and bolt 17, the bolt also having good contact with the sides of the slot 5, thence into the washer 13 and part 7 in a similar manner, through part 7 into the pole 1, and thence to the electrical apparatus.

In operation, assuming that the trolley harp is connected to the device as shown, the mechanism forms a flexible connection between the pole and harp in such a manner that the trolley harp, or that is the extreme end of the pole, may be swung vertically in a plane parallel to the line of advance of the pole, and may also be swung laterally in a direction at right angles to the line of advance of the pole, or to any intermediate point or position. The flexible connection serves to uphold the upper end or trolley wheel of the trolley pole so that the contact between the wheel and trolley wire is sufficient to prevent arcing at the point of contact between the wheel and wire. The parts may be easily removed from the pole when necessary to replace the same for any reason. Extensive tests have shown that with this device, arcing of the wheel and wire is very substantially reduced, as is also wear on the wheel and wire. Where the device is not employed, the trolley wheel causes considerable noise, giving discomfort to passengers and others, this particularly being the case on high speed interurban cars or trains equipped with trolley poles and running on an overhead system. With the present device the noise is reduced, and very largely eliminated, at least eliminated to an extent where it will not cause discomfort. It has also been found that the dewirement of the trolley wheel is considerably reduced, this in many cases preventing damage to the overhead wire and support. By preventing dewirement, and perhaps tearing loose of the overhead wire or supports, or tearing off the trolley from the car, the chance for damage to passengers, pedestrians or others is reduced; consequently accidents of this kind are not so common, and therefore liability for the same is reduced. Not the least of all of this is that loss of power compared with the ordinary construction has been reduced, because there is at all times a direct electrical communication through the bolt between the harp and the pole, so that the device is efficient and desirable for this reason alone.

In the construction ordinarily used heretofore, where the trolley harp is secured directly to the pole without a flexible connection, the trolley pole frequently bends when in use, and needs to be straightened or the same crystallizes, particularly when repeatedly bent and straightened, and the pole breaks. This frequently takes place in merely running under normal conditions, dewiring and striking of the cross wires, etc., not being considered. In the case where a trolley pole is provided with a contact of any suitable type fixed rigidly, or practically so, at the end of the pole, the parts all having some weight, in case of the pole striking a cross wire when dewired, the forward momentum of the contact device at the free end of the pole tends to bend the pole at substantially the point that it strikes the cross wire, and in some cases causes the pole to be broken, particularly after the pole has been bent and straightened several times. Cases have been known where the trolley harp or contact device has often been broken off and thrown with such force as to cast the same through the top of the car. Frequently not only is the pole bent or broken, but the cross wire, and perhaps the contact wire, is broken and falls to the ground. My device being exceptionally flexible, acts as a shock absorber and breaks the force of the blow of the pole, which is increased by the momentum of the trolley harp and wheel, so that bending of the pole from this cause is practically eliminated, and at least greatly reduced. By turning the nut 22, the flexibility of the device may be modified and the same made suitable for the requirements or preference of any individual railroad. It will be noted that while great flexibility is secured, the parts will not rotate or twist on the pole end, the wheel being always in proper position.

In the specification and claims, I have specified the device as a trolley harp carrier, and refer to the trolley wheel and trolley harp, but inasmuch as it is obvious that the device would operate the same or substantially so for any equivalent for the trolley wheel or harp, I wish to be understood in specifying a trolley harp and trolley wheel and similar terms as including any other type of contact device arranged to roll, slide or otherwise cooperate with the trolley wire, and take current therefrom or thereto.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described and in combination, a trolley wire contact device and a member arranged to be secured to a trolley pole, said members being spaced apart and each having an integral web inwardly of its end to form a cushion-receiving chamber, an elastic cushion in said chamber and abutting the side walls of said ends, and a bolt connecting said members and cushion together.

2. In a device of the kind described and in combination, a trolley harp having an integral web across its lower end, a trolley pole attaching part having a similar web at its end, a resilient cushion between said webs and spacing said parts, and securing means bearing on both of said parts and securing them together.

3. In a device of the kind described and in combination, a trolley wire contact device having an integral transverse web at its end, said web having an elongated slot therein, and a part arranged for attachment to a trolley pole, said second part having a web arranged with a square slot therein, a cushion member of elastic material arranged between said webs and spacing said parts apart, a bolt extending through said slots, and means for tightening said bolt so as to engage said webs.

4. In a device of the kind described and in combination, a trolley wire contact device having an integral transverse web at its end, said web having an elongated slot therein, and a part arranged for attachment to a trolley pole, said second part having a web at its end with a square slot therein, a cushioning member of elastic material arranged between said webs and spacing said parts apart, a bolt extending through said slots, said square slot being larger than the body of said bolt, means insertable between said square slot and bolt and having an elongated slot therein and extending transversely to said first named slot, and means for tightening said bolt so as to engage said webs.

5. In a device of the kind described and in combination, a trolley wire contact device having an integral web at its end extending transversely thereto, said web having an elongated slot therein, and a part arranged for attachment to a trolley pole, said second part having a web at its end with a square slot therein, a cushioning member of elastic material arranged between said webs and spacing said parts apart, a washer in said square slot and concentric therewith to form an elongated slot extending transversely to said first named slot, a bolt extending through said slots, and means for tightening said bolt so as to engage said webs.

6. In a device of the kind described and in combination, two spaced cooperating members each having a web at their opposed ends, one of said webs having an elongated slot therein, the other of said webs having a square slot therein, a cushion block of elastic material arranged between said cooperating members, a bolt extending through said webs, the head of said bolt being rectangular, and two of the parallel sides of said head being longer than the sides of said square slot, said head being insertable through said square slot so as to engage the plane sides of said webs, a member between the bolt and square slot and arranged between said web and cushion block, said member having an elongated slot therein extending transversely to said first named elongated slot, and means for tightening said bolt so that it engages said webs.

7. In a device of the kind described and in combination, two cooperating members having transverse webs at their opposed ends, one of said webs having an elongated slot therein, and the other of said webs having a square slot therein, a cushion block between said cooperating members and spacing them apart, a bolt for holding said cooperating members together, the head of said bolt being longer than the sides of the square slot, and of substantially the same width, whereby the head may be inserted through said slot and bear against the web.

8. In a device of the kind described and in combination, a trolley harp and a part arranged for attachment to a trolley pole, said parts having integral webs therein at the opposed ends, each of said webs having a slot therein, and a flange surrounding each of said webs, an elastic cushion between said webs and within the confines of said flanges, a bolt having a head longer than the length of said slots and insertable through one of said slots so that its head abuts against the web of the member through which it is inserted, and means on the other end of said bolt for tightening said cooperating parts together.

9. In a device of the kind described and in combination, a trolley harp having an integral web at its lower end, a trolley pole attaching part, and means directly securing said pole part and harp together against independent rotation, but permitting said parts to shift laterally in any direction in a plane.

10. In a device of the kind described and in combination, a trolley harp having an integral web at its lower end, a trolley pole attaching part, yieldable means between and spacing said pole part and harp, and means directly securing said pole part and harp together against independent rotation, but permitting a shifting laterally in any direction in a plane.

11. In a device of the kind described and in combination, a trolley harp having an integral web at its lower end, a trolley pole attaching part having a similar web, yieldable means between and spacing said pole part and harp, and means bearing on said webs and directly securing said pole part and harp together against independent rotation, but permitting them to shift laterally relative to one another in a plane.

In testimony whereof, I have hereunto signed my name in the presence of two subscribing witnesses.

CHARLES J. DORRANCE.

Witnesses:
  Roy W. Hill,
  Bertha Hartmann.